United States Patent [19]
Zubko et al.

[11] Patent Number: 5,286,079
[45] Date of Patent: Feb. 15, 1994

[54] FRAMELESS CONTAINER FOR CARRYING CARGO HAVING A MULTI-PANEL CONSTRUCTION

[75] Inventors: Ronald Zubko; Stephen W. Burns, both of Ossian, Ind.

[73] Assignee: Strick Corporation, Fairless Hills, Pa.

[21] Appl. No.: 987,925

[22] Filed: Dec. 9, 1992

[51] Int. Cl.⁵ .......................................... B62D 27/02
[52] U.S. Cl. ..................................... 296/181; 52/588; 220/1.5; 296/183
[58] Field of Search .................. 296/181, 183; 52/588, 52/535, 541; 105/409; 220/1.5

[56] References Cited

U.S. PATENT DOCUMENTS

| | | | |
|---|---|---|---|
| 1,744,824 | 11/1925 | Callison | 220/1.5 |
| 2,003,287 | 6/1935 | Fitch | 220/1.5 |
| 2,478,993 | 8/1949 | Wing | 296/181 |
| 2,934,372 | 4/1960 | Jewell et al. | 296/181 |
| 2,991,116 | 7/1961 | Andrews | 296/181 |
| 3,266,837 | 8/1966 | Stricker, Jr. et al. | 296/181 |
| 3,834,575 | 9/1974 | Carr | 220/1.5 |
| 3,842,755 | 10/1974 | Carr | 105/409 |
| 4,018,480 | 4/1977 | Stone | 298/27 |
| 4,212,405 | 7/1980 | Schmidt | 220/1.5 |
| 4,262,961 | 4/1981 | Schmidt | 296/182 |
| 4,357,047 | 11/1982 | Katz | 296/181 |
| 4,433,522 | 2/1983 | Yerushalmi | 52/588 X |
| 4,455,807 | 6/1984 | Ehrlich | 52/770 |
| 4,685,721 | 8/1987 | Banerjea | 296/181 |
| 4,904,017 | 2/1990 | Ehrlich | 296/181 |
| 4,940,279 | 7/1990 | Abott et al. | 296/181 |

*Primary Examiner*—Robert R. Song
*Attorney, Agent, or Firm*—Seidel, Gonda, Lavorgna & Monaco

[57] ABSTRACT

A frameless container is disclosed for carrying cargo and having opposing sidewalls that are comprised of a plurality of panels. The plurality of panels have a coplanar relationship relative to each other and comprise a majority portion having an edge region that has apertures therein and an inner face portion which defines a vertical plane. The panels further comprise integral connecting and bracing means comprising a first inclined portion, first and second ledge portions each having an aperture therein, a plateau portion, and a plurality of fasteners extending through and clamped within respective apertures of the first and second ledges, as well as the apertures of the majority portion. The plurality of panels are arranged in a side-by-side manner with the bracing and connecting means of the forward first panel overlapping a section of the majority portion of the next panel. The first inclined portion of the bracing and connecting means is selected to have a dimension so as to allow the inner faces of the majority portions of the panels to be tucked under the connecting and bracing means and to lie in the same plane.

17 Claims, 3 Drawing Sheets

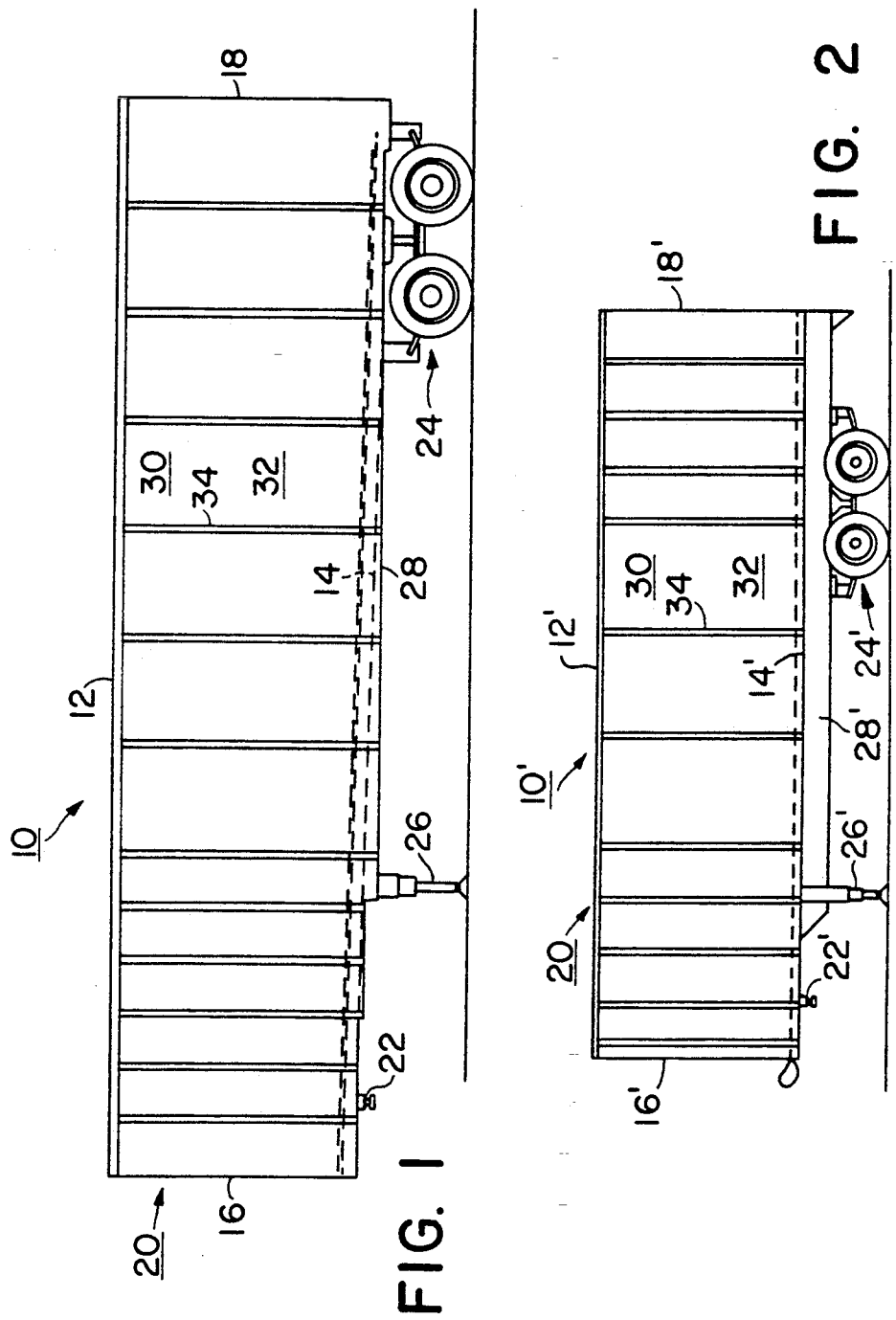

FRAMELESS CONTAINER FOR CARRYING CARGO HAVING A MULTI-PANEL CONSTRUCTION

FIELD OF THE INVENTION

The present invention relates to trailers and other means for moving cargos and, more particularly, to a frameless container comprised of multiple panels each having integral means for connecting and bracing together the panels in a side-by-side arrangement so as to preferably form the sidewalls of the container.

BACKGROUND OF THE INVENTION

Multi-panel construction of a sidewall of a trailer housing is well known and one such construction is disclosed in U.S. patent application Ser. No. 07/306,298 of Schmidt, filed Feb. 6, 1989, and which is assigned to the same assignee as the present invention. This patent application discloses sidewall construction of a trailer comprised of at least two groups of flat rectangular plates that are arranged in a side-by-side manner, and joined together by fasteners and a plurality of strips or posts which also maintain the panels in a predetermined spaced-apart relationship. It is desired, from cost and construction considerations, that a multi-panel construction be provided that is devoid of any such support posts.

In the construction of trailers, it is important to make available as much space as possible within the interior of the trailer housing for the purpose of carrying cargo. In this regard, it is desired that the walls of the housing, in particular, the sidewalls of the housing be devoid of any obstructions because the sidewalls are coextensive with the majority of the cargo being confined within the housing. Further, it is important that the portions of the sidewalls that face the confined cargo be devoid of any structural member that would otherwise cause a discontinuity in these faces of the sidewalls. More particularly, it is important that the inner faces of the multi-panel sidewalls be planar; i.e., that the inner faces of each opposing sidewall lie in the same plane.

Sidewall constructions of housings used for trailers must take into account the operating environment to which these sidewalls are subjected. For example, it is important that the construction of these sidewalls prevent any driven moisture, contaminants, or air flow passing along the outer or exterior surface of the sidewalls from finding its way into the inner faces of the sidewalls and, thus, into the interior of the trailer which might otherwise cause damage to the confined cargo.

Another important consideration for these sidewalls is the ability to provide outer faces for the sidewalls of the trailer that take into account aerodynamic features. More particularly, it is important to provide the outer surfaces of the sidewalls that reduce the aerodynamic drag typically experienced by trailers as they move along an interstate highway.

Accordingly, it is an object of the present invention to provide multi-panel sidewall construction of trailer housings and other cargo carrying containers that reduce the typical aerodynamic drag experienced by moving trailers.

Further still, it is an object of the present invention to provide multi-panel construction that may also be used for the end walls of the trailer housings.

It is another object of the present invention to provide sidewalls for trailer housings and other cargo carrying containers that have means to prevent the entrance of exterior moisture, contaminants, or air flow into the interior of these cargo carrying containers.

Still further, it is an object of the present invention to provide housings for carrying cargo containers that have an interior face, especially along the opposite sidewalls, that is free of obstructions, and all of the panels at each opposite sidewall are planar so as to make available as much space as possible for the carrying of cargo.

SUMMARY OF THE INVENTION

The present invention is directed to multi-panel sidewall construction for a housing that carries cargo and is devoid of external support members, so that a planar interior of the housing is provided that is devoid of any obstructions.

Each of the panels has predetermined length, height, width and thickness dimensions, and comprises a majority portion and integral connecting and bracing means. The majority portion has a first edge portion with apertures therein, and also has an inner face defining a vertical plane. The connecting and bracing means is located and blended into the edge of the majority portion which is opposite to the first edge. The integral bracing and connecting means comprises a first inclined portion having one end merged with the opposite edge of said majority portion, first and second oppositely located ledge portions each having an aperture therein, and a plateau portion. The first inclined portion preferably deviates from the vertical plane of the majority portion by an amount corresponding to the predetermined thickness of the panel. The first and second opposite ledge portions are respectively merged into first and second vertical offset portions which, in turn, are merged with the plateau portion, so that the plateau portion extends between the first and second vertical offset portions. The ledge portions provide the means for connecting the panels together, whereas the plateau portion provides the means for bracing the panels together.

In a preferred embodiment, the present invention provides a frameless container for carrying cargo comprising a floor, a roof, a pair of opposing sidewalls each comprised of a plurality of the panels of the present invention, and end walls. The end walls further include an access door, and all of the walls, including each of the multi-panel sidewalls, vertically extend from the floor to the roof.

The apertures in the connecting and bracing means and the majority portion each accept a fastener for connecting purposes. The plurality of panels are arranged in a side-by-side manner with the connecting and bracing means of a most forward first panel overlapping a section of the majority portion of the next panel. The bracing and connecting means has means that causes the connecting and bracing means to be offset from the vertical plane of the majority portion by a predetermined amount which provides for a planar orientation of the inner face portions of the overlapping members.

In another embodiment, a first inclined portion of the connecting and bracing means is selected so as to deviate from the vertical plane of the majority portion of the panel by an amount corresponding to the thickness of the majority portion of the panel, so that the inner faces of the side-by-side arranged panels all lie in the same plane, thereby, making available as much space as possible for the carrying of cargo by the frameless container of the present invention.

Other objects, advantages and novel features of the present invention will become apparent in the following detailed description of the invention when considered in conjunction with the accompanying drawings.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a side elevation view of a typical trailer in accordance with the present invention.

FIG. 2 is a side elevation view, similar to FIG. 1, but showing a container on chassis.

DETAILED DESCRIPTION OF THE PREFERRED EMBODIMENTS

Figure 3:
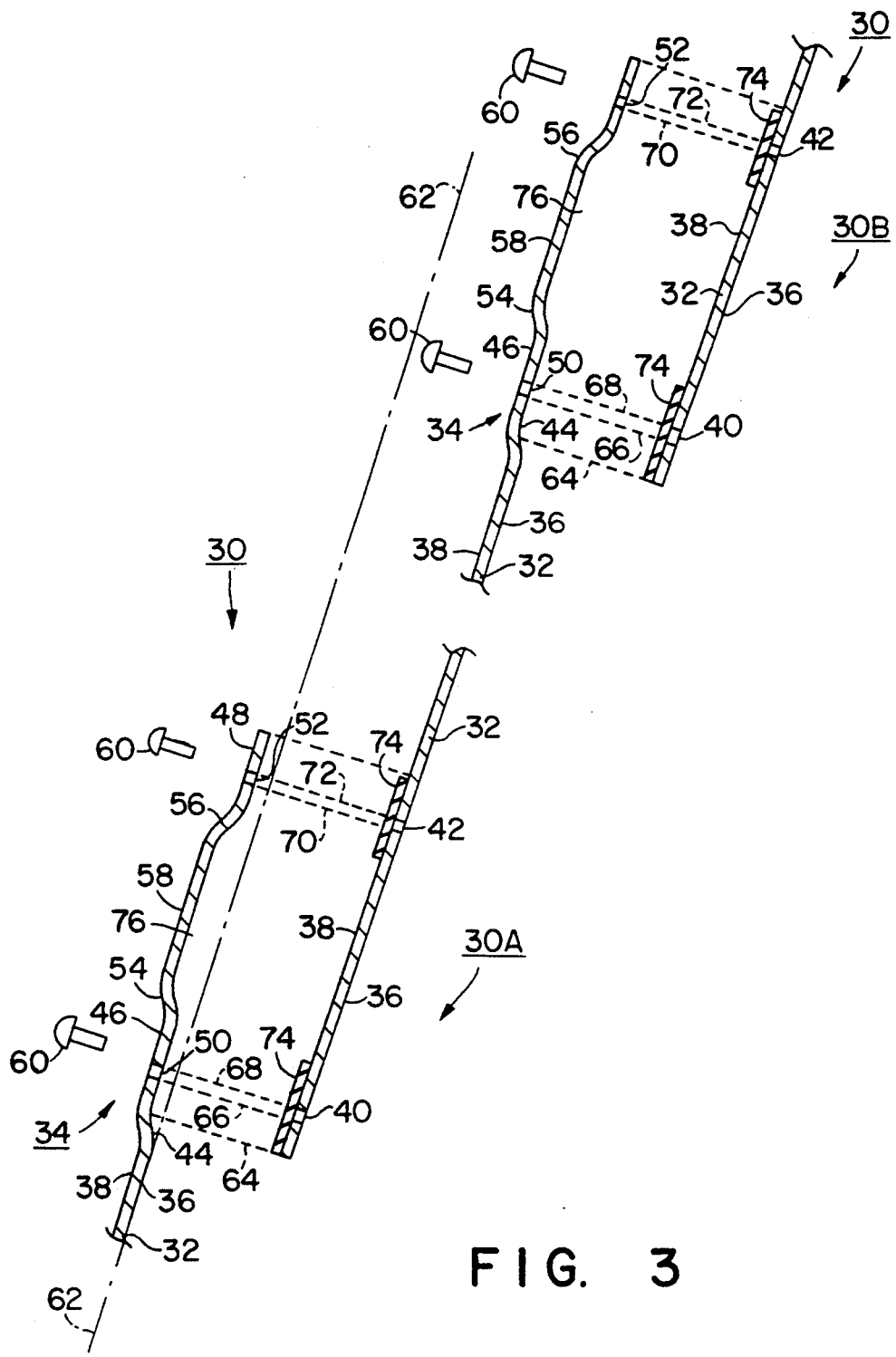
FIG. 3 illustrates the arrangement of coplanar panels of the present invention that form the sidewalls of a frameless container of the present invention for carrying cargo.

Referring to the drawings in detail, wherein like numerals indicate like elements and wherein the counterpart of such elements are designated by primes ('), there is shown in FIG. 1 a side-elevation view of a trailer housing 10. The instant invention is not restricted to trailer housing, but more broadly relates to the construction of frameless cargo-carrying containers and trailer bodies, such as the housing 10 of FIG. 1 adapted to be suitably hauled by tractor units.

The terms "container" and "cargo-carrying containers" are used herein in an interchanged manner and each such term is meant to designate a closed, hollow structure of substantially rectangular or square cross-section having a length of at least about ten feet, a width of at least about eight feet, and a height of at least about four feet. In one embodiment of the invention, a "container" may be mounted on a frame, supported by one or more bogies, and transported by being suitably connected to a tractor unit. A bulk cargo "container" may be filled with a pourable bulk cargo, such as grain or plastic beads, shipped on a suitable vessel, and discharged at its port of destination. "Containers" may be transported, in a stacked relationship, in the hold or on a deck of a ship, on railroad cars, such as flat-bed cars, or like well-known means.

The term, "trailer body," is generally included herein within the classification "cargo-carrying container," and is intended to designate a closed hollow storage unit of substantially rectangular or square cross-section, having a length of at least about twenty feet, a width of about eight feet, a height of at least about eight feet, and which includes integral fittings at the base thereof to which running gear, landing gear, and a kingpin are fastened. A "trailer body" is adapted to be hauled over-the-road, by a tractor unit and is not usually used to transport cargo by ship or by rail, except as an entire unit with bogies attached.

As used herein, the term, "frameless," designates a container, trailer body or cargo-carrying container in which a substantial portion, at least about 67% and preferably at least about 75%, of the load caused by the presence of cargo in the container, trailer body or cargo-carrying container is borne by the sidewalls of the container or trailer body. The walls of a "frameless" container, trailer body or cargo-carrying container are capable of safely withstanding stresses in the range from about 15,000 p.s.i. to about 25,000 p.s.i., which stresses are caused by the weight of the cargo in the container in the trailer body, as well as the dynamic forces initiated by the operation of the trailer or other vehicle, in which the frameless cargo-carrying container of the present invention finds application.

With regard to FIG. 1, the trailer housing 10 is adapted to be driven by a tractor. The housing 10 includes a roof 12 connected to a floor 14 by vertically extending end walls 16 and 18 as well as opposite sidewalls 20. The trailer 10 is provided with kingpin 22 at the front end, a wheel support assembly 24 (sometimes referred to as running gear) adjacent to the rear end, a set of retractable landing legs 26 intermediate the ends of the trailer 10, and a frame chassis 28.

The opposite sidewalls 20 are of particular importance to the present invention and comprise a plurality of panels 30 each of which, in turn, comprises a majority portion 32 and an integral connecting and bracing means 34, both of which are to be further described hereinafter. The principles of the present invention to be described are preferably related to the opposite sidewalls 20, but are also applicable to the end walls 16 and 18.

The trailer construction having the sidewalls 20 illustrated in FIG. 1 includes panels 30 composed of different widths. The width of the panels 30 is varied along the longitudinal length of the trailer to accommodate the variation in the load typically being experienced along the length of the trailer. In general, the width of the panels 30; that is, the spacing between the connecting and bracing means 34, decreases as the load along the trailer 10 increases.

In FIG. 2, there is illustrated a side elevation view of a trailer 10' in accordance with another embodiment of the present invention. The essential features of trailer 10' are identical with those of trailer 10; hence, corresponding prime numbers of FIG. 1 are used for the elements of the embodiment shown in FIG. 2, and the description given for the elements of FIG. 1 is equally applicable to those illustrated in FIG. 2.

As previously mentioned, the present invention is also applicable to frameless cargo-carrying containers that may be stacked several high, such as in the hull of a ship, usually after the containers have been removed from the under-frames of respective tractor units. It is to be understood throughout the description of the instant invention, that although a frameless trailer body is illustrated as the preferred embodiment of the invention, the basic principles of the invention are equally applicable to frameless cargo-carrying container used aboard vessels. The primary difference between a cargo-carrying container and a trailer body is that the trailer body includes, as an integral part of the trailer body, a kingpin 22 and landing gear 26 and hardware for attaching the running gear 24, so that the trailer body 10 is capable of being hauled by a tractor. The principles of the present invention that are applicable to both the frameless cargo-carrying container and the trailer body of FIGS. 1 and 2, may be further described with reference to FIG. 3.

In general and as to be more fully described, FIG. 3 illustrates a plurality of panels each having predetermined length, height, width, and thickness dimensions.

Each of the panels comprises a majority portion 32 and an integral connecting and bracing means 34. The majority portion has a first edge portion with apertures therein and also has an inner face portion defining a vertical plane. The connecting and bracing means has regions with apertures therein for accepting fasteners for connecting purposes, and also has a further region spanning between the regions of the apertures for bracing purposes. The connecting and bracing means has means so as to be offset from the vertical plane of the majority portion by a predetermined amount, so that when a majority portion of the panel is tucked under the connecting and bracing means, the inner face portion of said tucked-under majority portion does not extend past the vertical plane. The plurality of panels shown in FIG. 3 are arranged in a side-by-side manner with the connecting and bracing means of a forward first panel overlapping a section of the majority portion of the next panel, so that the apertures of the majority portion and connecting and bracing means are in alignment with each other and are affixed to each other by fasteners therein. The means of the bracing and connecting means that causes the connecting and bracing means to be offset by the predetermined amount from the vertical plane provides inner face portions of the overlapping members that lie in the same plane and, thus, are coplanar.

With regard to a preferred embodiment, FIG. 3 illustrates two panels 30 (indicated as 30A and 30B) in which their components 32 and 34 are shown as being broken apart and separated from each other. Further, the first panel 30A is partially illustrated as having its majority portion 32 positioned under a connecting and bracing means 34 of a preceding or prior panel (not shown), and having its connecting and bracing means 34 positioned over the subsequent panel shown as 30B. The major portion 32 and the connecting and bracing means 34 of each of the panels 30A and 30B each have an inner face portion 36 and an outer face portion 38. Each of the majority portions 32 has apertures 40 and 42 located at a first outer edge region and each of the panels 30 has predetermined length, height, width and thickness dimensions.

The panels 30 are each preferably formed of 3/16 inch rolled aluminum alloy plate, and the alloy of choice for these plates is aluminum alloy 5052H32 an alloy of aluminum with silicon, copper, iron, magnesium, chromium, and zinc, having a minimum tensile yield point of about 34,000 p.s.i. In selecting the material for the panels 30, the most important characteristics of the material of choice are a minimum plate thickness of about 5/32 inches and a preferred minimum tensile yield point of about 25,000 p.s.i. and weldability. Alloy 5052H32 is particularly suited for this purpose, because of its desired characteristics of strength, weight, cost and, if necessary, its weldability.

For a frameless cargo-carrying container of the present invention, the corner members (not shown) of the container are used for lifting purposes and, therefore, should of a material capable of withstanding lifting. Such a material is preferably formed from extrusions of alloy 7005-T53 and allows for good welds to be obtained at the corner fitting. Further details of the corner members are described, with reference to elements such as 110–117, in U.S. Pat. No. 4,212,405 of Schmidt, herein incorporated by reference.

With reference to FIG. 3, each of the panels 30A and 30B has apertures 40 and 42 located in a first edge region of the majority portion 32. Further, each of the panels 30A and 30B has bracing and connecting means 34 integrally blended into the majority portion 32 and which means comprises elements having reference numbers both of which are given in the below Table 1.

TABLE 1

| REFERENCE NUMBER | ELEMENT |
|---|---|
| 44 | a first inclined portion |
| 46 | first ledge portion |
| 48 | second ledge portion |
| 50 | aperture in portion 46 |
| 52 | aperture in portion 48 |
| 54 | first vertical offset portion |
| 56 | second vertical offset portion |
| 58 | plateau portion |
| 60 | fasteners |

As seen in FIG. 3 with reference to panels 30A and 30B, each connecting and bracing means 34 is located at and blended into an edge portion of the majority portion 32. As best seen with reference to panel 30A, the inner face portion 36 of the majority portion 32 defines a vertical plane to be further described. The first incline portion 44 accomplishes the blending between the connecting and bracing means 34 and the majority portion 32. The first and second ledge portions 46 and 48 are oppositely located and are respectively merged into the first and second vertical offset portions 54 and 56. The plateau portion 58 is merged with and extends between the first and second vertical offset portions 54 and 56.

The inner face portion 36 of each of the panels 30A and 30B is oriented in a coplanar manner relative to the inner face portions of each other, so that the interior portion of the frameless container formed by the mating panels is substantially free of obstructions, especially above the floor 14 to be further described. This coplanar orientation of these panels 30 may be further described with reference to the plane 62 shown in FIG. 3.

The first incline portion 44 is selected to have a predetermined height so that the first ledge portion is raised or oriented above the vertical plane 62 by an amount which substantially corresponds to the predetermined thickness of panel 30. This first incline portion 44 is preferably selected to have a height so that the majority portion 32 may be tucked under an overlapping bracing and connecting means 34. As seen in FIG. 3 which is meant to illustrate the assembly of the panels 30, during the assembly of the multi-panels 30 of the present invention, the majority portion 32 such as that of panel 30A, is raised upward or outward along line 64, so as to be mated with connecting and bracing means 34, thereby, allowing the inner face 36 of majority portion 32 of panel 30A to be coplanar with the vertical plane 62 shown in FIG. 3. The terms "coplanar" and "planar" as used herein have similar meanings with coplanar meant to represent a planar relationship between two or more panels, and planar meant to represent that the combined or composite panels lie in the same plane.

After the planar relationship is established, the fastening means 60 are inserted into aperture 50 and 52 which are respective aligned apertures 40 and 42 by means of guidelines 66 and 68 and 70 and 72 respectively. Each of the respective fasteners 60 are then clamped within their inserted apertures, thereby, rigidly connecting the bracing and connecting means 34 to the majority portion 32. This same sequence is then performed for the next panel, such as panel 30B of FIG. 3, so that the inner face 36 of each of the panels 30A and 30B has a planar relationship relative to each other. This sequence is continued until all of the panels making up the sidewalls 20 are arranged in a side-by-side relationship with the connecting and bracing means of a preceding or forward first panel overlapping a section of the majority portion of the subsequent or next panel.

Before the connection between the overlapping members 32 and 34 is accomplished, it is preferred that sealing members 74 be interposed between the first and second ledge portions 46 and 48 of the connecting and bracing means 34 and the overlapping portions 32 (in particular the regions of near apertures 40 and 42) so as to provide a sealing function between the mating surfaces of members 32 and 34.

It is also preferred that the length of the fasteners 60 be selected so that the fasteners extend through and are clamped within their respective apertures without extending substantially past the inner face portion 36 of their respective panels 30. Alternatively, it is desired that the apertures 40 and 42 of the majority portion 32 be provided with recesses so that the fasteners 60, in their respective apertures, do not even extend into the inner face portion of their respective panels 30.

It is further preferred that the apertures 40, 42, 50 and 52, as well as the fastening means 60, be adapted for receiving and holding the ends of tie down means, such as ropes or cables, that are used to hold down and confine the cargo within the interior of the container.

It is further desired that the first and second vertical offsets 54 and 56 be selected to provide an incline or vertical offset so that the plateau member 58 is separated from the overlapping majority portion 32 by a predetermined distance to allow for a vertical channel 76 therebetween which may be used to collect and downwardly drain any moisture, contaminant or air flow that might otherwise find its way into the interior of the container 10, in a manner to be hereinafter described with reference to FIG. 4.

Figure 4:
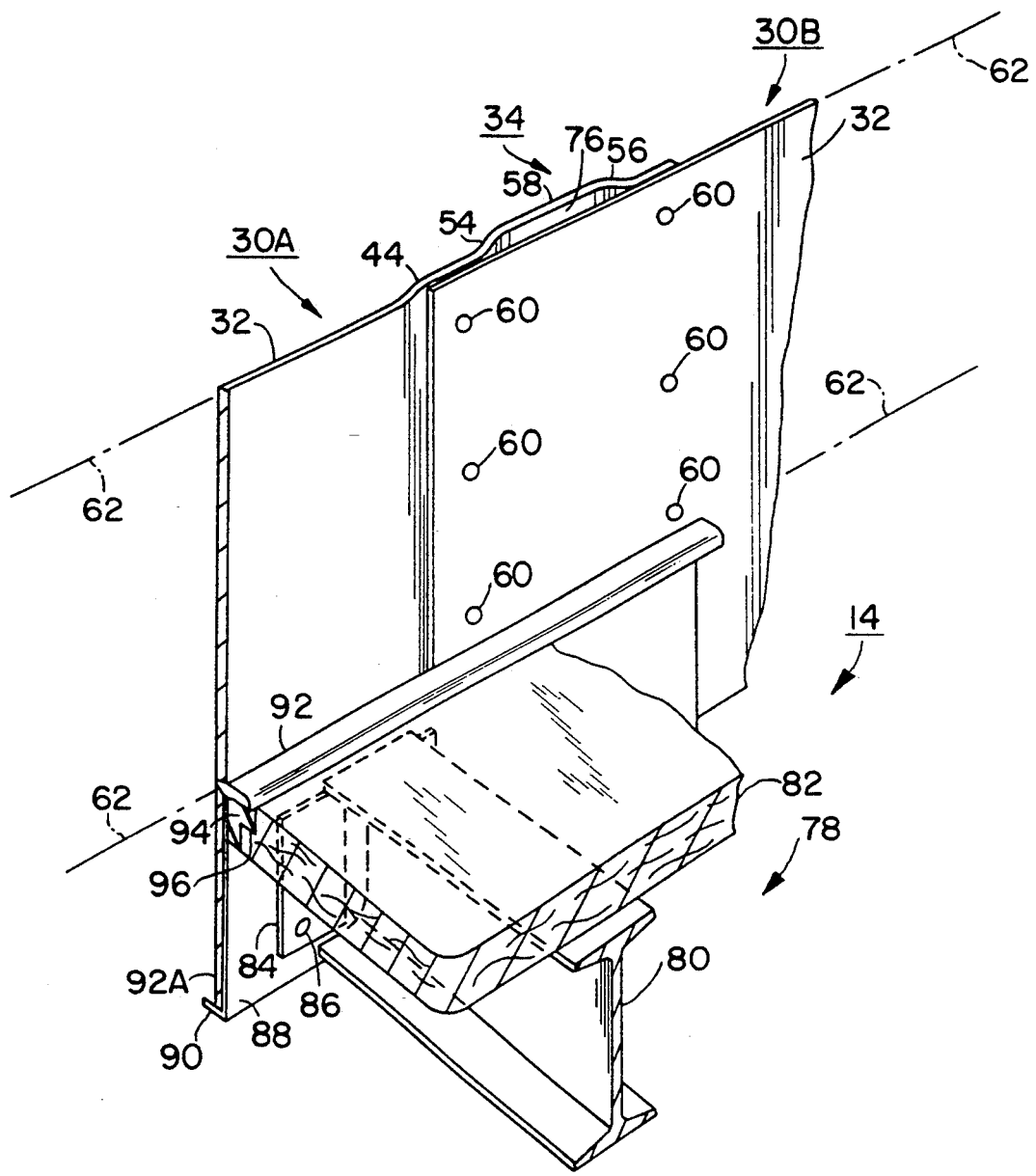
FIG. 4 illustrates the member of the floor being supported by a sill assembly.

FIG. 4 shows a floor 14 as being supported by a sill assembly 78 which includes transverse I-beams 80 upon which floor members 82 rest. The I-beams 80 have sill plates 84 connected to their ends by appropriate means such as welds 86. The sill plates 84 are also connected to a lower longitudinal bottom rail 88 that extends below the floor 14 and has a bottom outward flange 90 upon which rests a lower portion 32a of the majority portion 32 of panel 30. The bottom rail 88 has an upper flange 92 that is arranged in a planar orientation with respect to the resting floor members 82. The upper lateral flange 92 retains an elastomeric sealing strip 94, an extreme outer edge 96 of each floor member 82, as well as a vertical face portion of the bottom rail 88. The sealing strip 94 is oriented above the floor 14 and provides a sealing function between the panels 30, such as 30A and 30B shown in FIG. 4, and the floor 14 and bottom rail 88.

The flush-mounted and coplanar panels 30A and 30B, shown in FIG. 4 and, more particularly, in FIG. 1 as having their vast majority of their vertical members extending above floor 14, provide an interior portion the housing 10 which is free of obstructions above the floor 14. As further seen in FIG. 4, the first inclined portion 44, and the first and second offset portions 54 and 56 have a bowed or contoured shape. The shape and the dimensions of these portions 44, 54 and 56 are selected so that the outer surface that is presented to the exterior of the housing 10 of FIG. 1 of each of the multi-panels 30 has a contour which reduces the aerodynamic drag typically experienced by trailer housings moving along interstate highways. More particularly, the outer faces of the sidewalls 20 of the housing 10 is devoid of any structure, other than the panels themselves, that would otherwise disadvantageously intercept air flowing over the outer faces of the sidewalls 20 and, thereby, create aerodynamic drag. Further, these panels are provided with a smooth contour, a well chosen smooth contour which presents only a minor impediment to the air flowing over its outer face of the trailers of FIGS. 1 and 2.

As also seen in FIG. 4, the channel 76 (open at its top and bottom (not shown) ends) previously discussed with reference to FIG. 3, acts as a vertically extending conduit to collect and downwardly drain or bypass any moisture, contaminants, or air flowing over the outer surfaces of the panels so that none of these unwanted materials, fluids or unfiltered gases finds its way into the interior of the container that might otherwise damage the cargo.

The contouring of the outer faces of the panels 30 is also selected so that the outer faces of the containers and trailer housings of the present invention are adapted to accept adhesively applied graphics. More particularly, the outer faces of the connecting and bracing means 34 and, more importantly, the majority portion 32 are selected so as to provide a relatively smooth surface that does not cause any substantial distortion to graphic films or coatings commonly applied to trailers or containers for identification purposes.

Further still, the parameters of the bracing and connecting means 34 may be selected to accommodate the connection (fastening) and bracing (support) needs of the panels themselves. More particularly, the ledges 46 and 48 are selected to provide for the needs for the multiple panels 30 of the present invention to be connected together, whereas the plateau member 58, as well as its offset interrelated portions 54 and 56, are all selected to provide the bracing or strengthening needs of the connected panels 30. In particular, the width of the ledges 46 and 48 may be varied to supply a sufficient surface to accommodate the necessary connection between the panels, whereas the members 54, 56 and 58 may be selected to be of a particular material, as well as of a particular thickness, both to accommodate the various bracing, supporting and strengthening needs of the panels 30.

Although the hereinbefore given description has been directed to the planar panels 30 of sidewalls 20, it should be recognized that the side-by-side arrangement of the panels 30 may also be used to provide the end walls 16 and 18 of the present invention. In such an arrangement, means should be provided to allow for access means in either of the end walls 16 or 18, so that the cargo of the frameless container 10 may be entered therethrough and examined therein.

It should now be appreciated that the practice of the present invention provides a frameless container for carrying cargo having an interior portion, formed by flush mounted panels, that is free of obstructions, and in which the sidewalls, and even the end walls, are in a planar orientation so as to more advantageously make available as much space as possible for the carrying of the cargo.

Further, it should be appreciated that the practice of the present invention provides for flush mounted panels having fastening means, such as fasteners 60, that do not extend past the front inner faces of the flush-mounted panels that form the interior of container 10.

Still further, the present invention provides for a plurality of panels arranged in a side-by-side manner with a bracing and connecting means of the first panel overlapping a section of the majority portion of the next panel. The side-by-side arrangement provides for sidewalls and end walls that are coplanar.

Further still, the practice of the present invention provides for overlapping members that prevent the entrance of exterior driven moisture, contaminants or air flow from finding its way into the interior of the container. In addition, this prevention may be further improved by providing for sealing members between the overlapping connecting and bracing means and the majority portion of the panels.

Further still, the practice of the present invention provides for the outer surfaces of the sidewalls that are more advantageously contoured to reduce aerodynamic drag and also to allow the panels to be more adaptable to accept adhesively applied graphic films or coatings used for identification purposes of the frameless container of the present invention.

The present invention may be embodied in other specific forms without departing from the spirit or essential attributes thereof and, accordingly, reference should be made to the appended claims, rather than to the foregoing specification, as indicating the scope of the invention.

What we claim is:

1. A panel having predetermined length, height, width and thickness dimensions for a frameless container for carrying cargo, said panel comprising a majority portion and integral connecting and bracing means, said majority portion having a first edge portion with apertures therein and having an inner face defining a vertical plane, said connecting and bracing means being located and blended into the edge of the majority portion opposite to said first edge portion, said connecting and bracing means comprising: (a) a first inclined portion having one end merged with said opposite edge of said majority portion, said first incline portion deviating from the vertical plane of said majority portion by an amount corresponding to the thickness of said panel; (b) first and second oppositely located ledge portions that are coplanar and each having an aperture therein, said first and second opposite ledge portions respectively merged into first and second vertical offset portions with the first vertical offset portion being merged with said first inclined portion; and (c) a plateau portion merged with and extending between the first and second vertical offset portions.

2. A frameless container for carrying cargo comprising a floor, a roof, a pair of opposing sidewalls and end walls including an access door, each of said sidewalls and end walls vertically extending from said floor to said roof, each of said opposing sidewalls comprising: (a) a plurality of panels each having predetermined length, height, width, and thickness dimensions and each of said panels comprising a majority portion and integral connecting and bracing means, said majority portion having a first edge portion with apertures therein and having an inner face portion defining a vertical plane, said connecting and bracing means having regions with apertures therein for accepting fasteners for connecting purposes with said apertures of said majority portion, said connecting and bracing means further comprising: (i) means for offsetting said connecting and bracing means from said vertical plane of said majority portion by a predetermined amount sufficient so that when a section of the majority portion of said panel is tucked under said connecting and bracing means, the inner face portion of said tucked-under majority portion does not extend past said vertical plane, (ii) a plateau portion spanning between the regions of said apertures of said connecting and bracing means, said plurality of panels being arranged in a side-by-side manner with the connecting and bracing means of a forward first panel overlapping the section of the majority portion of the next panel, so that said apertures of said majority portion and connecting and bracing means are in alignment and affixed to each other by fasteners therein, said plateau portion of said bracing and connecting means causing said connecting and bracing means to be offset by said predetermined amount from said vertical plane orienting the inner face portion of said majority portions to lie in the same plane.

3. A frameless container for carrying cargo comprising a floor, a roof, a pair of opposing sidewalls and end walls including an access door, each of said sidewalls and end walls vertically extending from said floor to said roof, each of said opposing sidewalls comprising: (a) a plurality of panels each having predetermined length, height, width, and thickness dimensions, each of said panels having a majority portion with apertures located at a first outer edge region and having inner and outer face portion with said inner face portion defining a vertical plane, said panels further including integral connecting and bracing means also having inner and outer face portion and comprising (i) a first inclined portion having one end merged with the other end of said majority portion, said first incline portion deviating from said vertical plane of said majority portion by an amount corresponding to the predetermined thickness of said panel; (ii) first and second oppositely located ledge portions each having an aperture therein which is an alignment with a respective aperture of said majority portion, said first ledge portion merged with the other end of said first inclined portion, said first and second oppositely located ledge portions respectively merged into first and second vertical offset portions; (iii) a plateau portion merged with and extending between the first and second vertical offset portions; and (iv) a plurality of fasteners each extending through and clamped within respective apertures within said first and second ledge portions and said apertures of said majority portion; said plurality of panels being arranged in a side-by-side manner with the bracing and connecting means of a first panel overlapping said first outer edge region of the majority portion of the next panel, said first inclined portion of said bracing and connecting means allowing the inner face portion of each of said overlapping first and next panels to be coplanar.

4. A frameless container for carrying cargo comprising a floor, a roof, a pair of opposing sidewalls and end walls including an access door, each of said sidewalls and end walls extending from said floor to said roof, each of said end walls comprising: (a) a plurality of panels each having predetermined length, height, width, and thickness dimensions, each of said panels having a majority portion with apertures located at a first outer edge region and having inner and outer face portions with the inner face portion defining a vertical plane, said panels further including integral connecting and bracing means also having inner and outer face portions and comprising: (i) a first inclined portion having one end merged with the other end of said majority portion, said first inclined portion deviating from said vertical plane of said majority portion by an amount corresponding to the predetermined thickness of said panel; (ii) first and second oppositely located ledge portions each having an aperture therein which is in alignment with a respective aperture of said majority portion, said first and second oppositely located ledge portions respectively merged into first and second vertical offset portions; (iii) a plateau portion merged with and extending between the first and second vertical offset portions; and (iv) a plurality of fasteners each extending through and clamped within respective apertures within said first and second ledge portions and said apertures of said majority portion; said plurality of panels being arranged in a side-by-side manner with the bracing and connecting means of a first panel overlapping said first outer edge region of the majority portion of the next panel, said first inclined portion of said bracing and connecting means allowing the inner face portion of each of said sections of said majority portions which are connected to said connecting and bracing means to lie in the same place.

5. A frameless container for carrying cargo according to claim 3, wherein the inner face portion of each of said overlapping first and next panels of each of said sidewalls is oriented in a coplanar manner relative to the inner face portions of each other, so that a formed interior portion of said container is substantially free of obstructions above said floor.

6. A frameless container for carrying cargo according to claim 4, wherein the inner face portion of each of said overlapping first and next panels of each of said sidewalls is oriented in a coplanar manner relative to the inner face portions of each other, so that a formed interior portion of said container is substantially free of obstructions above said floor.

7. A frameless container for carrying cargo according to claim 3, wherein each of said fasteners is selected in its lengthwise dimension, so that the fasteners extend through and are clamped within said respective apertures without substantially extending past said inner face portion of its majority portion of said panel.

8. A frameless container for carrying cargo according to claim 4, wherein each of said fasteners is selected in its lengthwise dimension so that the fasteners extend through and are clamped within said respective apertures without substantially extending past said inner face portion of its majority portion of said panel.

9. A frameless container for carrying cargo according to claim 3, wherein each of the apertures of said first edge region has a recess so that the fasteners within the respective apertures do not extend past said inner face portion of said respective panel.

10. A frameless container for carrying cargo according to claim 3, wherein each of the apertures of said first edge portion has a recess so that the fasteners within the respective apertures do not extend past said inner face portion of said respective panel.

11. A frameless container for carrying cargo according to claim 3, wherein said first edge region is tucked under said overlapping bracing and connecting means to that any moisture, contaminant or air flow contacting the outer face portion of said bracing and connecting means is precluded from entering into said interior of said container.

12. A frameless container for carrying cargo according to claim 4, wherein said first edge region is tucked under said overlapping bracing and connecting means so that any moisture, contaminant or air flow contacting the outer face portion of said bracing and connecting means is precluded from entering into said interior of said container.

13. A frameless container for carrying cargo according to claim 3, wherein the thickness and shape of said connecting and bracing means are selected to reduce the aerodynamic drag that may be caused by having air flowing over the outer face portions of said connecting and bracing means.

14. A frameless container for carrying cargo according to claim 9, wherein said recesses further include means for receiving and holding the ends of tie down means that confine the cargo within said container.

15. A frameless counter for carrying cargo according to claim 3, wherein the amount of deviation of said first incline portion is selected so that the outer faces of said connecting and bracing means and majority portion are coplanar within a predetermined amount allowing the outer faces of said coplanar connecting and bracing means and said majority portion to accept adhesively applied graphics without causing substantial distortion thereof.

16. A frameless container for carrying cargo according to claim 3, wherein said bracing and connecting means further comprises sealing members interposed between said first and second ledge portions and said first outer edge region.

17. A frameless container for carrying cargo according to claim 3, wherein said first and second vertical offset portions are selected to be of value so that the plateau portion is separated from the overlapping majority portion by a predetermined distance to provide a vertical channel therebetween serving as a means for collecting and draining downward, any moisture, contaminants or air flowing over said vertically extending panels so that any such moisture, contaminants or air flow does not find its way into the interior of said container.

* * * * *